United States Patent

[11] 3,557,379

[72] Inventor Christopher G. Kelsey
    Glenalta, South Australia, Australia
[21] Appl. No. 753,238
[22] Filed Aug. 16, 1968
[45] Patented Jan. 19, 1971
[73] Assignee Ibes Australia Limited
    Plympton, South Australia, Australia
[32] Priority Aug. 16, 1967
[33] Australia
[31] 26,021/67

[54] THREE DIMENSIONAL TRACING PROBE WITH STYLUS OPERATING A PHOTOCELL PICK-UP
6 Claims, 7 Drawing Figs.

[52] U.S. Cl. ................................. 250/220,
    250/231, 250/237, 90/62
[51] Int. Cl. .................................... B23g 35/26,
    G01d 5/34

[50] Field of Search .......................... 250/237,
    219(TH), 231, 202; 90/62.1; 325/(Inquired);
    33/172.E

[56] References Cited
UNITED STATES PATENTS
2,086,153  7/1937  Bickel .......................... 250/231X
2,410,094  10/1946  Martinec ..................... 33/172

Primary Examiner—John Kominski
Assistant Examiner—V. Lafranchi
Attorney—Harness, Dickey & Pierce ABSTRACT: A probe for tracing a body having three dimensions, wherein the sensing element operates means to interrupt a beam of light between a light source and a photocell.

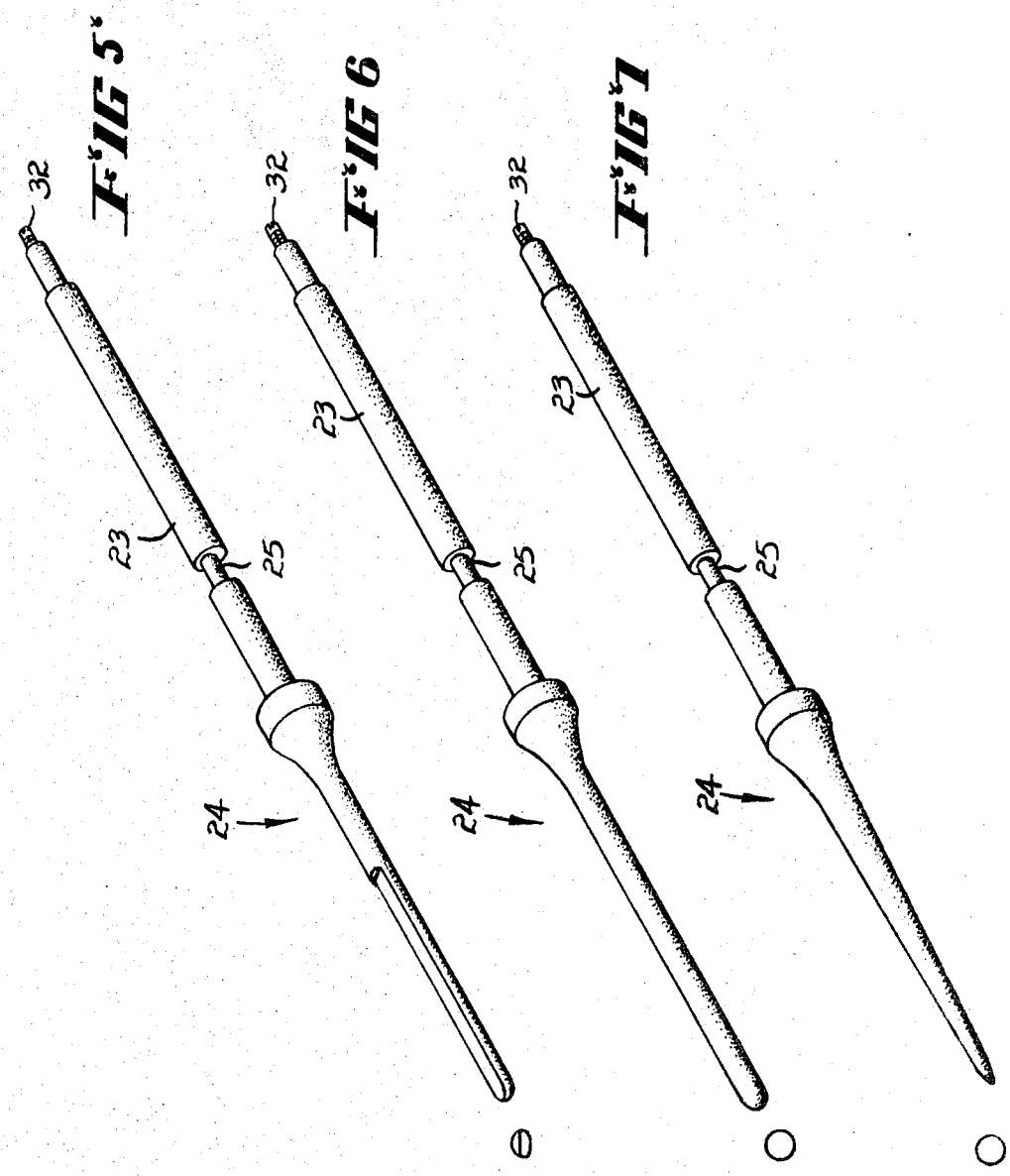

THREE DIMENSIONAL TRACING PROBE WITH STYLUS OPERATING A PHOTOCELL PICK-UP

This invention relates to a probe which is suitable for controlling a slave operation in the machine tool.

In machine tools it is common to employ probes to follow models, templates or the like, and the probes in turn control valving or switching means which result in identical movement by a slave member, for example a cutting tool, markoff pencil or the like.

There are a number of problems which have been encountered with probes previously used, and these have included the use of excessive forces to move the probing member (usually 4 pounds or more) resulting in deflections, damage to surface and other undesirable features responsible for loss of accuracy except under very favorable conditions. Furthermore previously proposed probes have been cumbersome and intricate in their design, and have been of high cost.

The main object of this invention is to overcome the above-mentioned problems and the invention may in one of its forms consist of a probe comprising a main body, a light source in the main body, a photocell in the main body aligned with but spaced from the light source, a stylus guide, means retaining the stylus guide within the main body for movement relative thereto, and an actuating arm on the stylus guide arranged to move therewith and interrupt light between the light source and photocell.

It is found with this invention that it becomes possible to provide a modulated signal responsive to very small displacements of the probe. Furthermore, since interference with a light beam constitutes the operative portion of the probe, it will be seen that large mechanical advantages can be used without any increase of operating pressure on the probe stylus being required, so that accuracies may be increased considerably within the useful range of requirements.

Embodiments of the invention are described hereunder in some detail with reference to and as illustrated in the accompanying drawings, in which:

FIG. 5 is a perspective and end view of a "D" type stylus;

FIG. 6 is a perspective and end view of a bullnosed stylus; and

FIG. 7 is a perspective and end view of a needle type stylus.

Figure 1:
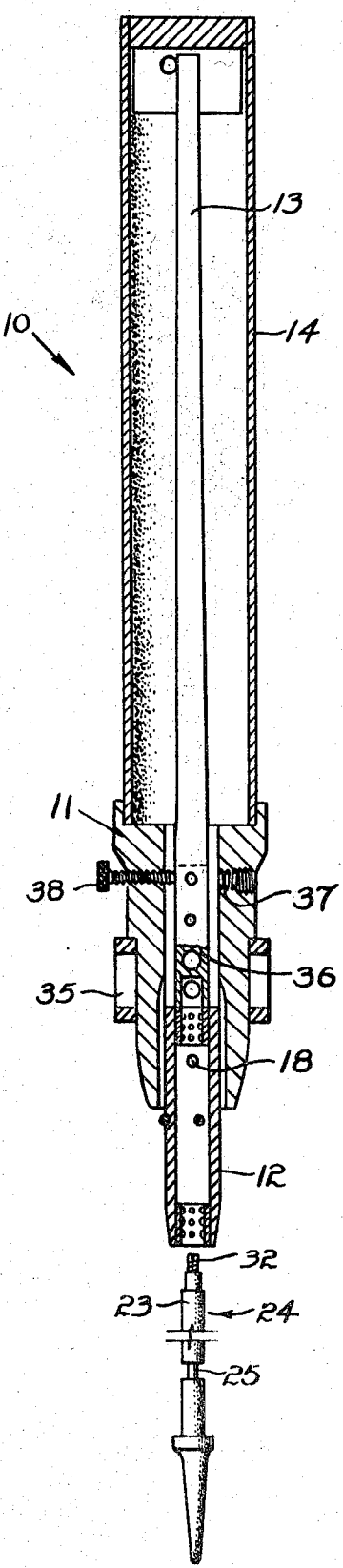
FIG. 1 is a section through a probe.
Figure 2:
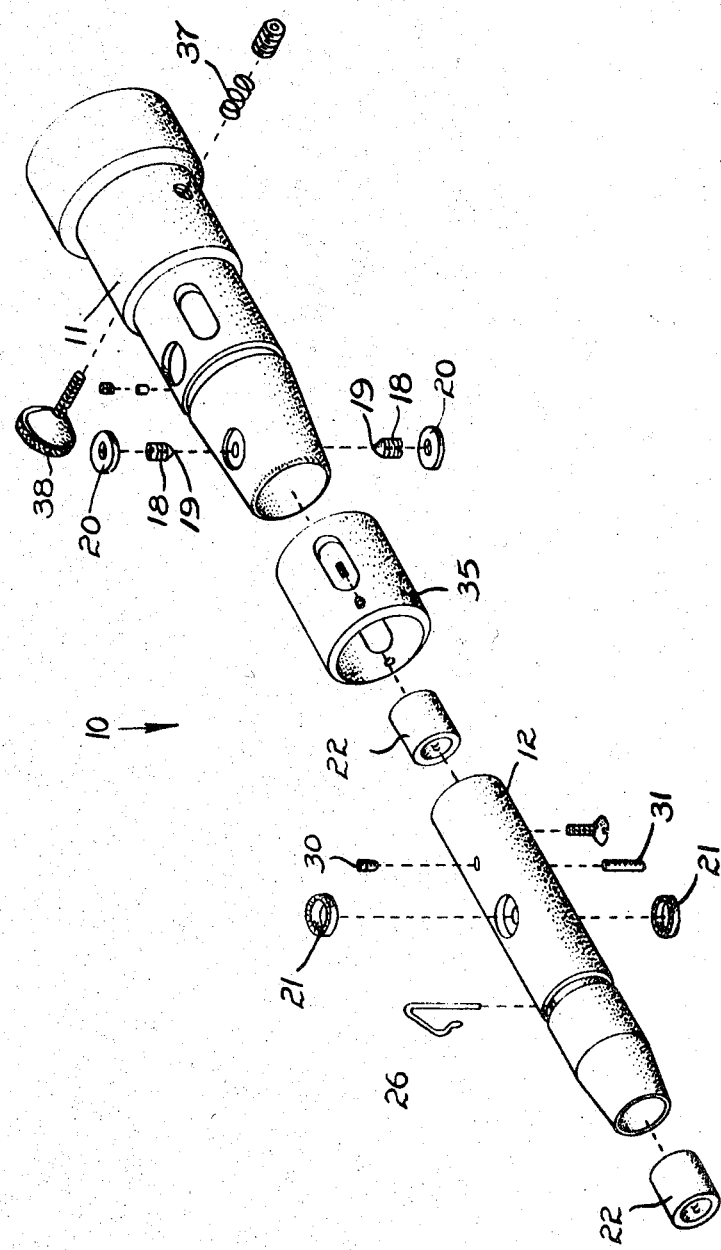
FIG. 2 is an "exploded" perspective view of the upper end of the probe.
Figure 3:
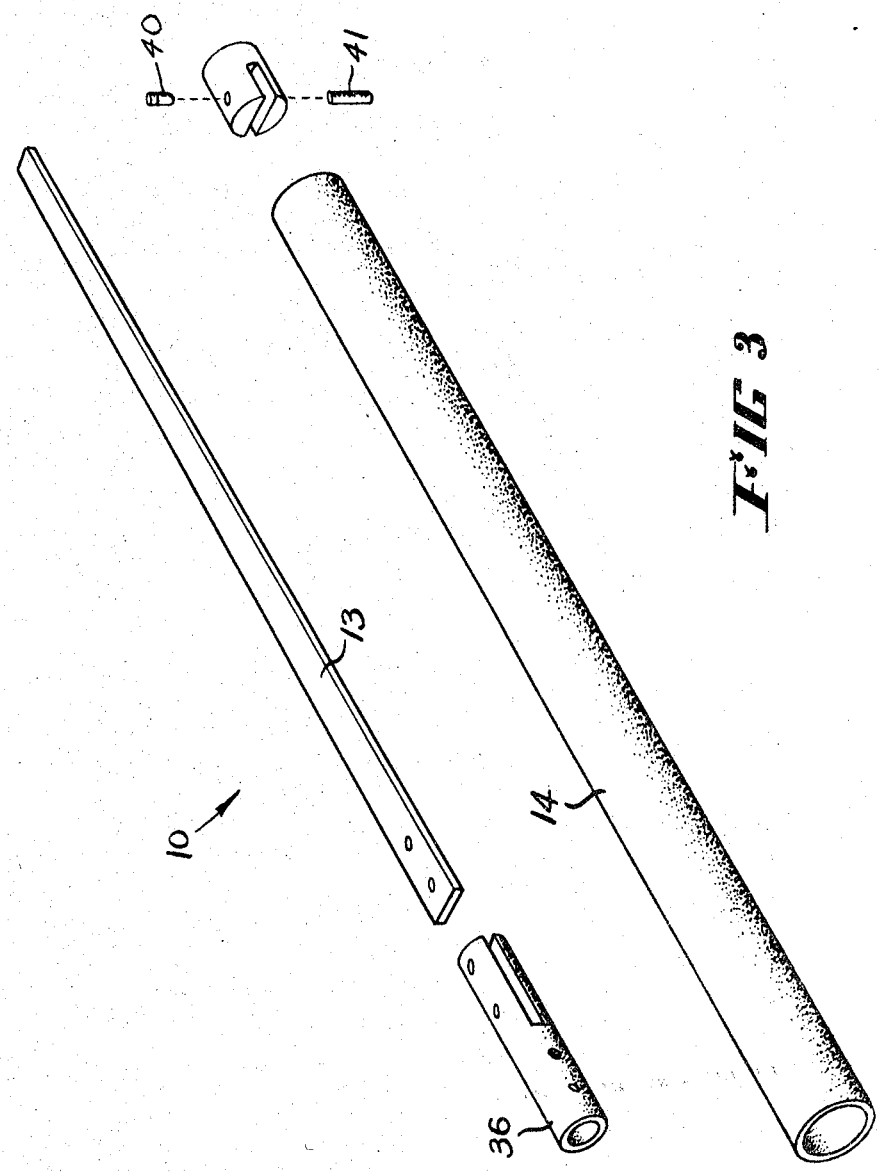
FIG. 3 is a similar "exploded" perspective view of the upper end of the probe.

Referring first to the embodiment of FIGS. 1, 2 and 3, a probe 10 is provided with a main body 11, a sleeve 12 within the main body, the sleeve constituting a stylus guide, an actuating arm 13 coupled to the sleeve 12 and movable within a body extension tube 14, and a stylus, the stylus being described in detail below.

The main body 11 is of somewhat tubular form and is provided with a pair of aligned pivot adjusting screws 18 having inwardly directed conical ends 19, the adjusting screws threadably engaging the walls of the main body and being provided with locking rings 20. These adjusting screws 18 engage the inner races of small ball bearings 21 contained in the walls of the stylus guide 12, the guide therefore being pivotal about the adjusting screws for limited pivoting movement within the tubular main body 11. The ends of the guide 12 are provided with ball bushings 22, and these engage an inwardly projecting rodlike portion 23 of a stylus 24. The stylus 24 is provided with a small necked portion 25 intermediate its ends, and this small necked portion accommodates a stylus retaining spring 26 which passes through an aperture in the side wall of the guide 12.

The guide 12 also contains a light source, the light source being a very small incandescent lamp 30 carried in the side wall of the guide 12, and aligned with a photo diode 31 which lies on the same diametral line. The inner end of the rodlike portion of the stylus 24 is provided with an adjusting screw 32, and this can be adjusted so that end wise movement of the stylus by a very small amount will sufficiently interrupt the light beam from the light source to the photodiode to result in a rapid change of signal strength from the photodiode.

A tubular inspection cover 35 is provided with a pair of diametrically opposite slots 36, and this is positionable over the main body where the diametrically opposite slots can align with similar slots in the main body thereby providing inspection means for the light source and photodiode, but upon rotation of the inspection cover the light source and photodiode become fully encased as the slots are placed out of alignment, thus reducing dust contamination.

The actuating arm 13 is a flat barlike member which extends rearwardly in the body extension tube 14, the body extension tube being retained in the rear end of the main body. The actuating arm is riveted at its forward end to an arm support 36 which is in turn engaged by the guide 12, so that any movement of the stylus which results in pivoting about the pivot adjustment screws will give a magnified movement at the end of the actuating arm 13. A light spring 37 urges against the actuating arm to push it to one side within the body extension tube, and transversely of its pivotal axis against an adjusting screw 38.

The body extension tube 14 contains a second miniature incandescent lamp 40 and second photodiode 41 again on a diametral line, the arrangement however being such that movement of the actuating arm will result in interruption of the beam of light from the light source to the photodiode, and again a small movement of the stylus will result in a correspondingly large change of signal from the photodiode.

A series of stylus are available for any one probe, the stylus having ends of different shape, for example needle shape, bullnosed, or "D" type, as illustrated in FIGS. 7, 6 and 5 respectively.

The photodiodes can be of varying types, but are preferably of the type which will provide a modulated signal the magnitude of which depends on the degree to which the light beam is interfered with in both instances. This signal can then control an analogue circuit with a conversion to digital, or if desired the entire control circuit can be analogue. Even with conversion to digital however the effective modulation is not lost, and this is of importance when slave motors must accelerate and decelerate.

The incandescent lamps are found to be more effective if they are of the type which emit infrared rays, although other types are also useful.

The manner in which the device functions is as follows:

Since the probe is to follow a model, the electrical circuit is provided with an inhibiting device so that upward or downward movement of the stylus will simultaneously reduce or stop travel, and also drive a motor moving in the direction of the axis of the stylus in an upward or downward movement thus enabling the stylus to continue following the model. The axis of pivot is adjusted to be at right angles to the direction of travel across the model, so that any pivotal movement of the stylus due to striking a wall, or moving up or down a slope, will result in the corresponding reduction of traverse speed enabling the stylus to follow the contour.

The above embodiment has been described with reference to relative movements in a vertical direction and in one horizontal direction. To achieve movements in other horizontal directions, the whole probe can simply be rotated. If however relative movements between two horizontal directions are required, this can be achieved by replacing the locking ring and pivot adjustment screw either with a ball or alternatively with a second ring and second pivot adjusting screws constituting a universal joint, so that they stylus is movable in two directions. In such a case the direction of travel will be determined by a switch to be in one direction, the transverse movement giving inhibition to travel to enable the stylus to follow contours, while if the direction varies say more than 45° the switch can be changed over to give the main direction of travel in the other direction, variations of stylus movement giving deviations in the first said direction.

Figure 4:
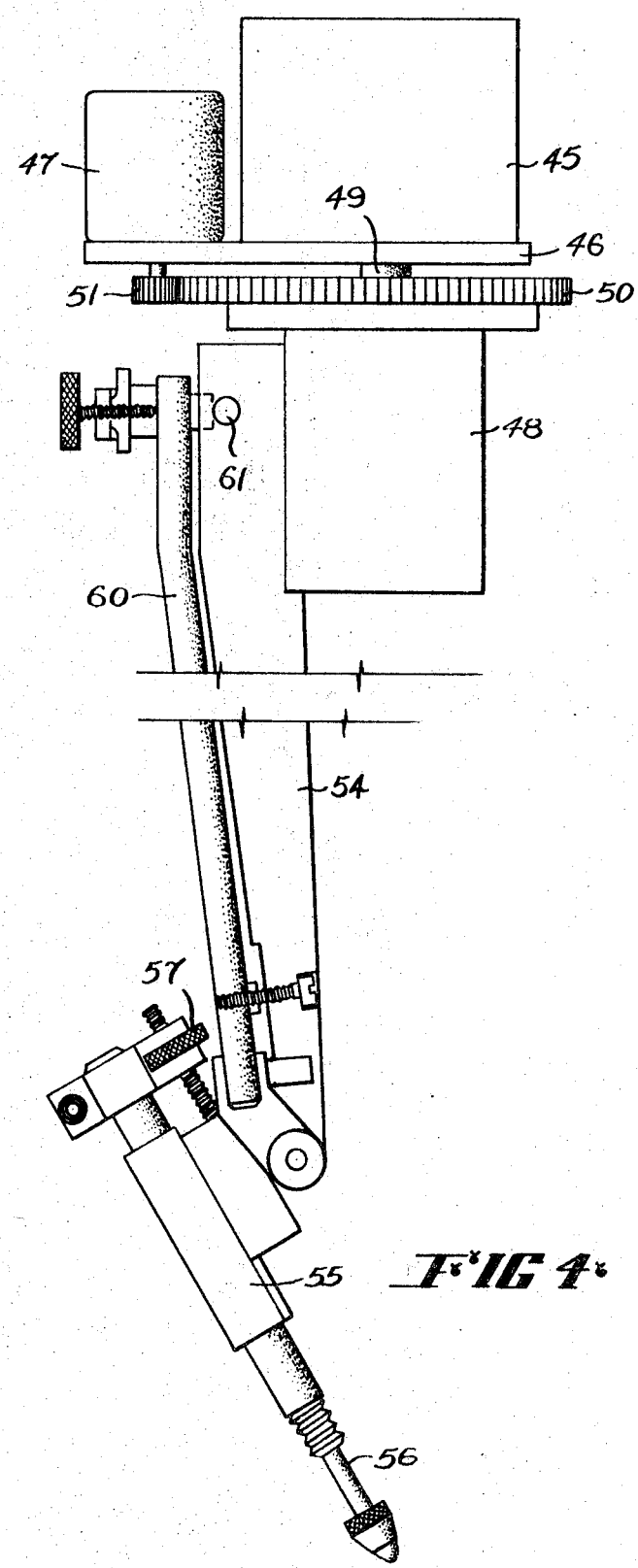
FIG. 4 is a partly sectioned elevation of a rotatable probe, being a second embodiment of the invention.

However, a rotatable probe is generally preferred to the above arrangement, and such a probe is illustrated as a second embodiment in FIG. 4. A support socket 45 is mounted on a plate 46 which also carries a stepping motor 47. A rotatable head 48 is carried on bearings (not shown) journaled on a shaft 49 depending from the plate 46, and a driven gear 50 on the head 48 meshes with a driving pinion 51 on the shaft of the motor 47. A depending bracket 54 has pivoted to its lower end a stylus guide sleeve 55 which slidably supports a stylus 56, and an adjusting screw 57 positions the stylus 56 within the sleeve. The sleeve 55 also has an actuating arm 60 extending upwardly therefrom, the arm 60 interrupting light from a light source 61 as in the first embodiment.

It will of course be appreciated that the electrical circuitry can vary widely, and that the constructional details can also vary widely within this invention. However it will be seen that the invention provides an exceedingly accurate and light pressure type of probe which is effective in following low density models (for example plaster of paris) without damage to the model surface, or without measurable deflection of the probe members. Furthermore it will be seen that the device is most useful with electrically or electronically controlled circuitry which in turn controls slave means.

I claim:
1. A probe comprising:
a main body;
a light source in the main body;
a photocell in the main body aligned with but spaced from the light source;
a stylus guide;
means retaining the stylus guide within the main body for movement relative thereto;
an actuating arm on the stylus guide arranged to move therewith and interrupt light between the light source and photocell;
low friction means in the side walls of the stylus guide;
pivot adjusting means engaging the side sidewall of the main body;
the pivot adjusting means having means engaging the low friction means to thereby retain the stylus guide within the main body;
support means in the ends of the stylus guide;
a stylus guided for axial movement within the stylus guide by the support means;
a further light source in the stylus guide and a further photocell in the stylus guide aligned with but spaced from the light source; and
adjustment means on an end of the stylus arranged to interrupt light between the light source and photocell upon inward movement of the stylus within the stylus guide.

2. A probe comprising:
a main body;
a light source in the main body;
a photocell in the main body aligned with but spaced from the light source;
a stylus guide;
means retaining the stylus guide within the main body for movement relative thereto;
an actuating arm on the stylus guide arranged to move therewith and interrupt light between the light source and photocell;
a pair of aligned ball bearings in the side walls of the stylus guide;
a pair of pivot adjusting screws threadably engaging the side wall of the main body;
the pivot adjusting screws having conical ends engaging the inner races of the ball bearings to thereby constitute said means retaining the stylus guide within the main body;
ball bushings in the ends of the stylus guide;
a stylus guided for axial movement within the stylus guide by the ball bushings;
a further light source in the stylus guide and a further photocell in the stylus guide aligned with but spaced from the light source; and
adjustment means on an end of the stylus arranged to interrupt light between the light source and photocell upon inward movement of the stylus within the stylus guide.

3. A probe comprising a main body, pivot adjusting screws in the side wall of the main body, stylus guide, ball bearings in the side wall of the stylus guide, conical ends on the pivot adjusting screws engaging the inner races of the ball bearings to thereby retain a stylus guide within the main body for pivotal movement relative thereto, an actuating arm on the stylus guide, a light source in the main body, a photocell in the main body aligned with but spaced from the light source, and a stylus carried by and projecting from the stylus guide, the actuating arm being arranged to interrupt light between the light source and photocell upon deflection of the stylus; and
ball bushings in the ends of the stylus guide guiding the stylus for movement in an axial direction within the stylus guide, a necked portion on the stylus, a retaining spring within the stylus guide and located in the necked portion to thereby limit said axial movement, a further light source in the stylus guide, a further photocell also in the stylus guide aligned with but spaced from the light source, the stylus interrupting light between the further light source and further photocell upon said axial direction movement of the stylus into the stylus guide.

4. A probe according to claim 3 further comprising: an inspection cover, and apertures in the inspection cover, the cover being rotatable around the main body whereby said apertures are alternatively positionable in alignment with the light source and photocell for access thereto, or out of alignment whereby the inspection cover covers the photocell and light cell.

5. A probe comprising a mounting plate, a head rotatably carried by the mounting plate, a bracket on the head, a stylus guide sleeve pivoted on an end of the bracket, a light source on the bracket, a photocell on the bracket aligned with but spaced from the light source, and an actuating arm on the pivoted stylus guide sleeve arranged to interrupt light between the light source and photocell upon pivotal movement of the stylus guide sleeve relative to the bracket.

6. A probe according to claim 5 further comprising a stylus means within the guide sleeve guiding the stylus for axial movement therein, and adjusting screw arranged to adjust the stylus position within the guide sleeve, the operative surface of the stylus being alignable with the axis of rotation of the head.